ERASING MAGNET MOUNTING AND ASSEMBLY

Filed Nov. 9, 1950

Edmund Barany
Harold W. Bauman
Melvin Sackter
INVENTORS

BY Henry L. Kesten
James B. Boyer
ATTORNEYS

Patented Aug. 31, 1954 2,688,053

UNITED STATES PATENT OFFICE 2,688,053

ERASING MAGNET MOUNTING AND ASSEMBLY

Edmund Barany and Harold W. Bauman, Chicago, and Melvin Sackter, Arlington Heights, Ill., assignors to Ampro Corporation, Chicago, Ill., a corporation of Illinois Application November 9, 1950, Serial No. 194,917

13 Claims. (Cl. 179—100.2)

The present invention relates to magnetic erasing and conditioning that is applied to elongate record bodies of magnetizable material. Such erasing and conditioning is applied as the record body travels toward a magnetic recording head to eliminate previous recording or stray magnetization that the body may have acquired, and to bring the record body as closely as practical to a completely demagnetized condition for subsequent recording. There are two general types of erasing and conditioning techniques, one being accomplished by passing the record body through a high frequency alternating magnetic field, the other by passing it successively through regions of opposite polarity of a non-alternating magnetic field of constant intensity, such as produced by a permanent magnet or an electromagnet energized by direct current.

The invention relates to the second, so-called "direct," type of erasing and conditioning. While the invention may be applied either to a permanent or a direct current-energized electromagnet, the former is regarded as preferable because of its lower cost, and the invention is disclosed in connection with a permanent magnet.

In direct erasing and conditioning, the most advantageous technique is to pass the record body successively through magnetic field regions adjacent the respective pole pieces of the magnet, that is to say through field regions of opposite polarity, and respectively of such intensities that in the first region the record body is magnetized to saturation and in the second field region is exactly demagnetized. Since there is unavoidable variation between intensities of fields produced by different magnets, and since tolerances are necessary in the structures and elements supporting such magnets and those that determine the path of a record body past the erasing magnet of a magnetic recording instrument, it is highly desirable that means be provided for relative adjustment between the record body path and an erasing magnet, in order to permit as close as practical an approach to a positional relation of the record body path to the magnetic field regions through which it passes that is productive of the desirable final complete record body demagnetization. Also, for avoidance of stray magnetic fields or irregular fringing effects, it is desirable that an erase magnet be supported on the instrument by a clamping structure arranged to hold a magnet of a shape designed for development of a field having proper characteristics for producing the intended erasing and conditioning effects, rather than to resort to magnet shapes that are specialized for securement, or to a magnet provided with holes for reception of securing elements such as screws or bolts. Additionally, it is desirable that the pole piece of the magnet that produces the saturating field region through which the record body travels first be closely adjacent and exposed direct to the record body path so that the field region through which the record first passes is of maximum intensity to fully saturate the record body.

A primary object of the invention is the provision of a novel, inexpensive and fully satisfactory bracket assembly for supporting an erasing and conditioning magnet alongside the record body path of a magnetic recording instrument.

Another primary object is the provision of such a magnet-supporting bracket with novel means providing for relative adjustment between the record body path and the trailing pole piece of a magnet supported by the bracket so that, by adjustment of the record body path relative to such trailing pole piece, a close approach may be made to complete demagnetization of a record body traveling past the assembly and that has been magnetized to saturation by the field region adjacent the leading pole piece.

Another object is the provision of novel means for attaching a magnet to a supporting bracket, affording adequate security of mounting and positioning to a permanent magnet of a preselected form, and not requiring any special configuration or distortion of the magnet body for purposes of support and securement.

Still another object is the provision of a novel magnetic erasing and conditioning assembly for use in a magnetic recording instrument.

Figure 5:
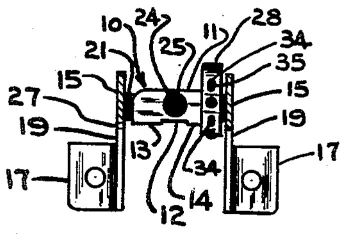
Fig. 5 is a horizontal section on line 5—5 of Fig. 2.
Figure 4:
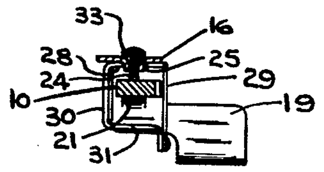
Fig. 4 is a vertical section on line 4—4 of Fig. 2.

Describing the drawings in detail, and first referring to Figs. 4 and 5, a permament magnet 10 has a contour that is desirable for magnetic record body erasing and conditioning, being of a modified horseshoe shape, having a rear edge surface 11, front edge surface 12 and pole piece surfaces 13, 14 spaced slightly outward from and parallel to surface 12. The top and bottom surfaces of the magnet are plane and parallel as seen in Fig. 4.

Figure 1:
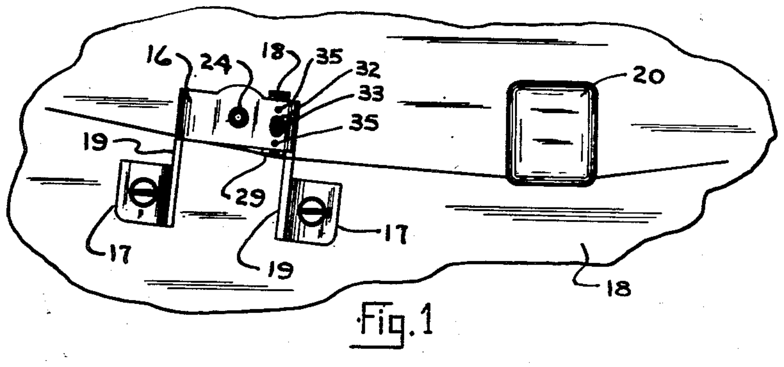
Fig. 1 is a fragmentary and somewhat schematic plan of a part of a magnetic instrument showing a magnetic recording head and a permanent erasing magnet and supporting bracket assembly arranged according to the invention.
Figure 2:
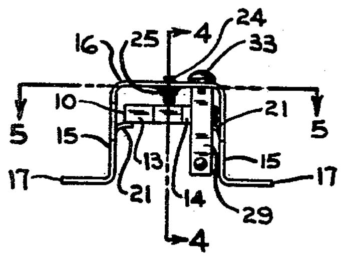
Fig. 2 is a front elevation of such a magnet and supporting bracket assembly.

The bracket for supporting and securing the magnet 10, forming an important part of the invention, is generally U-shaped in front elevation, comprising a pair of spaced legs 15 connected by a cross reach 16. The legs 15 are provided with offbent feet 17 for securement to a recording instrument cover plate, as 18 in Fig. 1, such feet being offset from legs 15 by reaches 19 that extend forward from the leg edges, so that when the bracket is mounted on a recording instrument, as seen in Fig. 1, the legs and cross reach are located to one side of the record body path leading to a recording head 20, the feet parts 17 are located to the opposite side of such path and the reaches 19 extend under said path.

For supporting a magnet 10, the legs 15 are provided with intermediate offset portions, shown as tongues 21, that are struck from the legs and bent inward. These offset portions provide upper surfaces that are spaced from the inner surface of cross reach 16 for supporting contact with the underside of a magnet 10.

To secure a magnet in the bracket in contact with the supporting surfaces of offset portions 21, a clamping device is arranged to exert force oppositely on the upper magnet surface and on cross reach 16. Such a device is shown as a screw 24 threaded through a deformed and threaded boss 25 of reach 16 and into clamping contact with the opposed surface of magnet 10.

The bracket described above comprises a simple and inexpensive device for supporting an erasing magnet, and by proper dimensioning of its parts and location of the magnet-supporting portions 21, such a magnet is properly spaced from an instrument cover plate on which the assembly is mounted to register the magnet with the record body path of such infringement.

Figure 3:
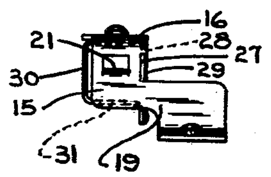
Fig. 3 is an elevation of the approach or leading end of such an assembly.

From Figs. 3 and 5 will be seen that the pole piece surfaces 13, 14 of magnet 10 are located closely adjacent the planes of the front edges of the respective bracket legs 15. The leg on the approach side may be provided with a shallow cutout 27 that permits a record body closely to approach the leading pole piece surface 13, so that in passing through the relatively intense field region close to such pole piece surface the record body will be magnetized to saturation.

To provide relative adjustment between the record body path and the trailing pole piece surface 14, a record body guide surface is arranged in front of the trailing pole piece surface to limit the approach of a record body to the latter surface. This guide surface is adjustable toward and away from the pole piece surface so that the intensity of the second field region through which the record body passes can be selected.

To these ends a strip-like body 28 is mounted in crossing relation to bracket cross reach 16 and is supported thereon for in-and-out adjustment, and body 28 carries at its forward end a reach 29 that is extended in right angular relation to body 28 and lying in front of the trailing magnet pole piece surface 14. The outer surface of reach 29 constitutes the record body guide surface that fixes the spacing of the record from pole piece surface 14 in the proper field region.

For strength, body 28 and reach 29 advantageously constitute two sides of a rectangular frame that also includes rear and bottom reaches 30, 31. This frame extends around magnet 10, as seen in Fig. 4. The front reach may extend downward below the record body path and a bottom reach 31 may have a downwardly turned extremity riveted to the lower part of the front reach.

For securing the frame 28, 29, 30, 31 in a selected position, cross reach 16 is provided with a transverse slot 32, shown in Fig. 1, and a clamp screw 33 that is threaded into body 28 penetrates this slot. For maintaining the frame in proper crossing relation to the cross reach 16, body 28 may have alignment slots 34 into which extend projections 35 struck out from bracket reach 16.

The assembly described above, in addition to the advantages that have already been pointed out, constitutes an erasing device excellently adapted for cooperation with other magnetic recording instrument elements such as those disclosed by application for U. S. patent of Edmund Barany and Melvin Sackter, Serial No. 194,915, filed November 9, 1950. The upper surfaces of the bracket reaches 19 that extend under the record path serve as supports for a slack record body that may be rested on them as the instrument is being threaded, and such a slack record body will be supported at least partly in opposition to the record body-guiding surfaces that define the record path. The record body guiding surfaces are also well adapted to having a record body pressed against them by resilient means such as those disclosed by the applications herein referred to.

From the foregoing the principles and advantages of the invention will be evident, and it will be apparent that changes in specific details and arrangements may be resorted to without departing from the invention as defined by the claims.

We claim:

1. A bracket assembly for supporting an erasing magnet for cooperation with an elongate record body of magnetizable material traveling toward the recording head of a magnetic recording instrument; said assembly comprising a bracket including a pair of spaced leg members having portions for securement to a recording instrument, a reach spaced from said portions and connecting said leg members, said leg members having offset intermediate portions for supporting contact with the respective ends of such a magnet, and means carried by said connecting reach for clamping such a magnet against said offset portions.

2. A bracket assembly for supporting an erasing magnet for cooperation with an elongate record body of magnetizable material traveling toward the recording head of a magnetic recording instrument; said assembly comprising a U-shaped bracket including a pair of spaced leg members having end portions for securement to a recording instrument, a reach spaced from said end portions and connecting said leg members, said leg members having intermediate portions offset to provide magnet-contacting surfaces spaced from said reach, means carried by said reach for clamping such a magnet against said surfaces, and an element carried by said bracket and having a record body-contacting surface disposed to limit approach of a record body to a pole surface of a magnet so clamped, said element being mounted on said reach for adjustment of the spacing between said surface and such pole surface.

3. A bracket assembly according to claim 2, wherein said element comprises a flat strip mounted upon and in crossing relation to and for slidable adjustment relative to said reach, and wherein said record body-contacting surface is provided by an angularly off-set reach of said strip.

4. A bracket assembly according to claim 2, wherein said element comprises a strip-like body having at least two reaches relatively disposed at substantially right angles, one of said reaches being secured to said bracket cross reach in crossing relation thereto, and means so securing said reach and permitting its axial adjustment, the other said reach providing the record body-contacting surface.

5. A bracket assembly according to claim 2, wherein said element comprises a substantially rectangular frame having a reach secured to said bracket cross reach in crossing relation to the latter and by means permitting axial adjustment of the former, and a second reach providing said record body contacting surface, said frame being positioned to extend around a magnet so clamped in said bracket.

6. A bracket assembly according to claim 2, wherein said means for clamping a magnet comprises a screw threaded through said bracket cross reach between said leg members.

7. A bracket assembly according to claim 2, wherein said end portions of the bracket leg members are provided with parts projecting laterally from said leg members in spaced relation to said record body-contacting surface and provide surfaces for supporting a slack record body at least partially in opposition to said record body-contacting surface.

8. An erasing magnet assembly for a magnetic recording instrument, comprising a permanent magnet body having a pair of substantially plane and parallel opposite sides, a third side and a pair of pole pieces projecting beyond said third side, a bracket comprising spaced leg members having offset intermediate portions providing supporting surfaces contacting one of said plane magnet surfaces at opposite ends of said body, a reach of the bracket connecting said leg members together and spaced from said supporting surfaces, and a screw threaded through said reach between said leg members, contacting the second said plane surface of said magnet body and clamping the latter against said supporting surfaces.

9. An erasing magnet assembly for a magnetic recording instrument, comprising a permanent magnet body having a pair of substantially plane and parallel opposite sides, a third side and a pair of pole pieces projecting beyond said third side, a bracket comprising spaced leg members extended past the opposite ends of said permanent magnet body and having offset intermediate portions providing supporting surfaces contacting one of said plane surfaces at opposite ends of the magnet body, and a bracket cross reach connecting said leg members together and spaced from said surface, clamping means acting oppositely upon said reach and the second plane magnet body surface to clamp said body against said supporting surfaces, and an element carried by said bracket and having a record body-contacting surface spaced from and extended in front of one of said pole pieces.

10. An erasing magnet assembly for a magnetic recording instrument in accordance with claim 9, wherein said element is supported on said bracket reach for in-and-out adjustment to select spacing of said record body-contacting surface forming said pole piece.

11. An erasing magnet assembly for a magnetic recording instrument in accordance with claim 9, wherein said element comprises a substantially rectangular frame of flat side reaches, said frame extending around said magnet and one of its pole pieces, one of said reaches being secured in face to face contact with and in crossing relation to said bracket reach and said record body-contacting surface of another of said reaches.

12. An erasing magnet assembly for a magnetic recording instrument comprising a U-shaped bracket including side members having substantially coplanar front edges, a magnet body having a front side and pole pieces projecting beyond said front side and having substantially coplanar front surfaces, means securing said magnet body inside said bracket with said pole piece front surfaces adjacent the plane of said bracket member front edges, and an element secured to said bracket and providing a record body-contacting surface in front of and spaced from the front surface of one of said pole pieces.

13. An erasing magnet assembly according to claim 12 wherein said element is adjustable on said bracket for selection of the spacing between said record body-contacting surface and said pole piece front surface.

References Cited in the file of this patent

UNITED STATES PATENTS

| Number | Name | Date |
|---|---|---|
| 1,332,690 | Rosenfield | Mar. 2, 1920 |
| 2,513,653 | Kornei | July 4, 1950 |
| 2,535,486 | Dank | Dec. 26, 1950 |
| 2,594,934 | Kornei | Apr. 29, 1952 |